(12) United States Patent
LeBlanc

(10) Patent No.: US 11,761,328 B2
(45) Date of Patent: Sep. 19, 2023

(54) TEMPERATURE AND STRAIN MEASUREMENT USING A SHARED FIBER-OPTIC CABLE WITHIN A WELLBORE

(71) Applicant: Halliburton Energy Services, Inc., Houston, TX (US)

(72) Inventor: Michel LeBlanc, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 233 days.

(21) Appl. No.: 17/391,385

(22) Filed: Aug. 2, 2021

(65) Prior Publication Data
US 2023/0035493 A1 Feb. 2, 2023

(51) Int. Cl.
*E21B 47/07* (2012.01)
*E21B 47/007* (2012.01)
*G01D 5/353* (2006.01)
*G01K 11/322* (2021.01)
*G01L 1/24* (2006.01)

(52) U.S. Cl.
CPC ............ *E21B 47/07* (2020.05); *E21B 47/007* (2020.05); *G01D 5/35361* (2013.01); *G01D 5/35364* (2013.01); *G01K 11/322* (2021.01); *G01L 1/242* (2013.01)

(58) Field of Classification Search
CPC ... E21B 47/007; E21B 47/07; G01D 5/35361; G01D 5/35364; G01K 11/322; G01L 1/242
See application file for complete search history.

(56) References Cited

U.S. PATENT DOCUMENTS 6,380,534 B1 * 4/2002 Farhadiroushan ............................ G01D 5/35364
385/13
9,651,435 B2 5/2017 Jaaskelainen et al.
(Continued)

OTHER PUBLICATIONS

Clement et al. ("B-OTDR Solution for Independent Temperature and Strain Measurement in a Single Acquisition," in Journal of Lightwave Technology, vol. 39, No. 18, pp. 6013-6020, Sep. 15, 2021, doi: 10.1109/JLT.2021.3088956. (Year: 2021).*

*Primary Examiner* — Kristina M Deherrera
*Assistant Examiner* — Jean F Morello
(74) *Attorney, Agent, or Firm* — Kilpatrick Townsend & Stockton LLP

(57) ABSTRACT

A well system includes a fiber-optic cable that can be positioned downhole along a wellbore. The well system further includes a plurality of opto-electrical interfaces to communicatively couple to the fiber-optic cable to monitor temperature and strain along the fiber-optic cable. Additionally, the well system includes a processing device and a memory device that includes instructions executable by the processing device to cause the processing device to perform operations. The operations include receiving data representing frequency or phase shift measurements from the opto-electrical interfaces using at least two frequency or phase shift measurement techniques. Further, the operations include generating a temperature shift output and a strain change output using an inversion comprising sensitivity ratios and the data representing the frequency or phase shift measurements from the plurality of opto-electrical interfaces.

20 Claims, 4 Drawing Sheets

(56) References Cited

U.S. PATENT DOCUMENTS

| | | | |
|---|---|---|---|
| 2011/0090496 A1* | 4/2011 | Samson | G01D 5/35364 356/301 |
| 2013/0091942 A1* | 4/2013 | Samson | E21B 47/10 73/152.18 |

* cited by examiner

TEMPERATURE AND STRAIN MEASUREMENT USING A SHARED FIBER-OPTIC CABLE WITHIN A WELLBORE

TECHNICAL FIELD

The present disclosure relates generally to wellbore sensing techniques and, more particularly (although not necessarily exclusively), to measuring both temperature and strain within a wellbore using a fiber-optic cable that is shared to make both measurements.

BACKGROUND

A well (e.g., an oil well or a gas well) may include a wellbore drilled through a subterranean formation. The subterranean formation may include a rock matrix permeated by oil or gas that is to be extracted using the well system. Information about the subterranean formation, the wellbore, or wellbore operations, may be gathered within the wellbore using a fiber-optic cable. Detecting multiple different types of information using the same fiber-optic cable can be challenging. For example, measuring strain in a downhole fiber-optic cable can be challenging because temperature also affects the response of the fiber-optic cable. A "Brillouin shift" instrument can measure shift in Brillouin frequency. The Brillouin shift instrument can be used for measuring changes in strain in the wellbore, but the Brillouin shift instrument may be affected by a temperature shift in the wellbore. And shifts in temperature may not be able to be apportioned in measuring the shift in Brillouin frequency. Temperature may be measured using Raman-based distributed temperature sensing (DTS), which is sensitive to temperature, and a system may use this knowledge to extract the temperature effect from the Brillouin measurement. But, a DTS and a Brillouin shift instrument may be used on different types of fiber—e.g., multi-mode fiber and single-mode fiber—such that a cable with multiple optical fibers may be needed. Furthermore, commercial DTS and Brillouin instruments are optimized for operation at different wavelengths (typically 1064 nm for DTS and 1550 nm for Brillouin), which requires more fiber characterization and additional difficulty in aligning the depths of the measurements due to dependence on the light wavelength of the effective index of refraction of the optical fibers.

DETAILED DESCRIPTION

Certain aspects and features relate to measuring temperature and strain within a wellbore using multiple frequency or phase shift measurement techniques over a fiber-optic cable. The techniques can use multiple interrogator instruments that obtain information from the fiber-optic cable using different sensing techniques. The measured frequency or phase shifts can be used as a static measurement resulting from changes in temperature and strain. Using temperature shift factors and strain change factors known about the interrogator instruments, the interrogation approach, and the optical fiber or fibers in the fiber optic cable, the measurement techniques can use inverting relationships to determine a temperature shift output and a strain change output of the fiber-optic cable within the wellbore. Some aspects of the features disclosed herein can take advantage of linear independence of different measurement techniques in their combined response to strain and temperature. In some examples, the fiber-optic cable may be a shared optical fiber cable having a single optical fiber used to measure both strain and temperature.

Measuring strain using a downhole fiber-optic cable is made difficult by the fact that temperature also affects a response of the fiber-optic cable. Measuring strain and temperature using the cable may rely on some form of measurement disambiguation of the fiber response. Some examples of the present disclosure can involve extracting both strain and temperature from the same fiber, such as a single-mode fiber (SMF) or a multimode fiber, using two different measurement techniques that are sensitive to both temperature and strain along the fiber-optic cable.

In one example, Brillouin-shift and Rayleigh-based relative frequency shift can be on the same optical fiber in a downhole environment. Both a Brillouin-backscatter instrument (such as the OmniSens DITEST, or the NKT Lios OTS4) and a Rayleigh optical frequency domain instrument (such as the Luna OBR 4600, or the Alcatel OptoDAS), can be used to obtain two measurements for each location along a common fiber-optic cable. Because these measurement types have different ratios of sensitivity to strain and temperature, an inversion can be used to provide unambiguous strain and temperature outputs.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
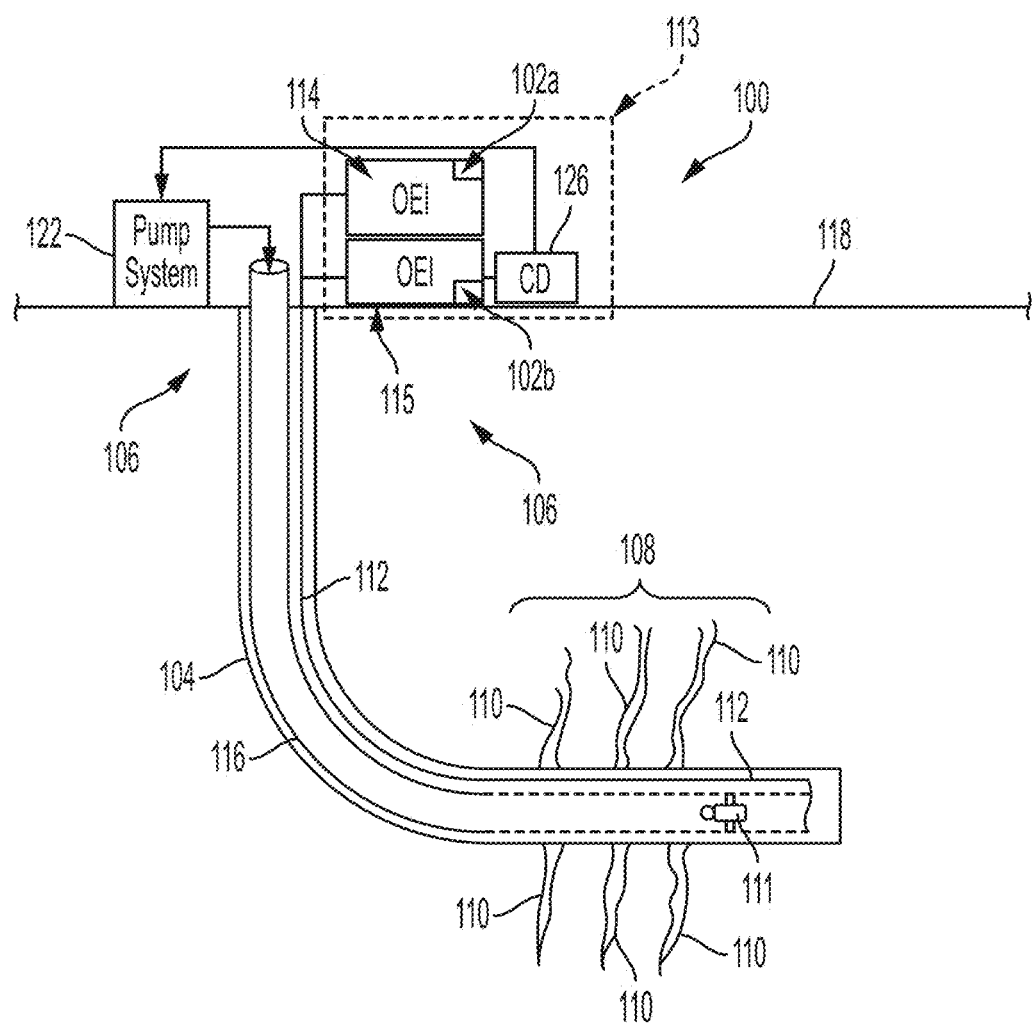
FIG. 1 is a schematic view of a well system with a fiber-optic measurement system for measuring strain and temperature according to one example of the present disclosure.

FIG. 1 is a schematic diagram of a well system 100 with a fiber-optic measurement system 113 for measuring strain and temperature according to one example of the present disclosure. A wellbore 104 may be created by drilling into a formation 106 (e.g., a hydrocarbon bearing formation). In some examples, the wellbore 104 may provide access to hydrocarbons stored within the formation 106 upon completion of formation stimulation operations, such as hydraulic fracturing operations that are performed after the wellbore 104 is drilled.

In some examples, the fiber-optic measurement system 113 may include a length of fiber-optic cable 112 that extends along a length of the wellbore 104. Fiber-optic cable sensing that is performed by the fiber-optic measurement system 113 is a method of using changes to light traveling in or backscattered from the fiber-optic cable 112 to detect temperature shifts and strain changes from a reference fiber configuration, such as the fiber-optic cable at room temperature without any fiber tension. Information may be collected from opto-electrical interfaces 114, 115 during wellbore operations, and the information may be used to determine adjustments to parameters of the wellbore operations.

As illustrated, the fiber-optic cable 112 may be communicatively coupled to the opto-electrical interfaces 114, 115. The opto-electrical interfaces 114, 115 can be two interfaces that are capable of detecting temperature and strain within the wellbore 104. Fiber optic cable 112 may contain one or more optical fibers. Opto-electrical interfaces 114 and 115 may be connected to the same optical fiber (e.g., via a 2×2 fiber splitter, or via a wavelength-division multiplexer also such as an optical add/drop multiplexer) or to two separate optical fibers. In operation, the fiber-optic cable 112 and the opto-electrical interfaces 114, 115 may be used to measure frequency shifts from the fiber-optic cable 112. In an example, the opto-electrical interfaces 114, 115 may inject optical signals into the fiber-optic cable 112 and detect variations in a backscatter signal received from the fiber-optic cable 112. The backscatter signal received from the fiber-optic cable 112 may be due to Rayleigh scattering or Brillouin scattering and changes to this backscatter may result from temperature and strain changes along the fiber-optic cable 112. The opto-electrical instruments 114, 115 can operate with interrogators 102a, 102b. In some examples, the opto-electrical interfaces 114, 115 can include two interrogators 102a, 102b that are capable of multiplexing optical signals into the fiber-optic cable 112 and detecting the frequency or phase shift measurements from the fiber-optic cable 112 that result from changes in temperature and strain experienced by the fiber-optic cable 112. In an example, the interrogator 102a of the opto-electrical interface 114 may include a Rayleigh optical frequency domain reflectometer (OFDR), and the interrogator 102b of the opto-electrical interface 115 may include a Brillouin Optical Time-Domain Reflectometer (BOTDR) backscatter instrument. For example, the Rayleigh instrument within the opto-electrical interface 114 can be a frequency-swept distributed acoustic sensing (DAS) instrument operated as an Optical Frequency Domain Reflectometer (OFDR), or a standard, pulse-based, DAS instrument. The standard, pulse-based DAS instrument may be based on optical time-domain reflectometry (OTDR). Other suitable types of interrogators may also be used within the opto-electrical interfaces 114 and 115, such as a Brillouin-based Optical Time Domain Analyzer (BOTDA) that uses counter-propagating pulses in the optical fiber and requires access to both ends of the optical fiber in cable 112.

The fiber-optic cable 112 may be attached to an outer surface of a casing 116 within the wellbore 104, suspended from a surface 118 of the wellbore 104 between the casing 116 and a wall of the wellbore 104 (e.g., within cement between the casing 116 and the wall of the wellbore 104), or positioned within the casing 116. The opto-electrical interfaces 114, 115 may be positioned at the surface 118 of the well system 100. The opto-electrical interfaces 114, 115 may detect changes in temperature and strain along a length of the wellbore 104. In one example, the fiber-optic measurement system 113 may include a computing device 126 with a data acquisition system that can receive the frequency shift data from the opto-electrical interfaces 114, 115 and process the frequency or phase shift data to determine changes in temperature, and separately to determine changes in strain along the fiber-optic cable 112. The computing device 126 may include a processor and a non-transitory computer-readable medium that includes instructions that are executable by the processor to perform various operations described herein with regard to FIGS. 1-4.

The opto-electrical interfaces 114, 115 can be positioned at the surface 118 of the wellbore 104 to monitor temperature and strain changes along the length of the fiber-optic cable 112. In some examples, the fiber-optic measurement system 113, which may include the fiber-optic cable 112, can measure the changes in strain and shifts in temperature along the fiber-optic cable 112 at multiple locations along the length of the fiber-optic cable 112. For example, the opto-electrical interface may measure changes in strain in 1 meter increments (i.e., 1 meter sampling intervals) along the length of the fiber-optic cable 112. Other section lengths of the fiber-optic cable 112 that are either larger or smaller than 1 meter are also contemplated, such as 20 centimeters to 10 meter lengths. The fiber-optic measurement system 113 may measure the changes in strain along the fiber-optic cable 112 at a rate of 0.0001 (i.e., for near static) to 100,000 measurements per second. In some examples, measuring a temperature shift and a strain change at every location along the fiber-optic cable 112 may be relative to a reference fiber configuration, such as at room temperature and without fiber tension. A resulting data stream of measured signals may be used in a processing algorithm to determine features associated with the measured signals.

The fiber-optic measurement system 113 can include at least two different opto-electrical interfaces 114, 115. The two opto-electrical interfaces 114 and 115 can be within the same housing, including using the same light source, or different housings for performing two different measurement techniques. The opto-electrical interfaces 114, 115 can each include one of the at least two different interrogators 102a and 102b (e.g., a Rayleigh instrument, a Brillouin instrument, etc.). The multiple different interrogators 102a and 102b may use different techniques, which can contribute to the instruments having different sensitivity ratios to temperature and strain. For example, the interrogators 102a and 102b can include their own respective sensitivity ratios. The sensitivity ratios can be a relation between the obtained frequency or phase shift measurements to values of temperature shift and strain change. In some examples, the opto-electrical interface 114 may include a Brillouin-backscatter instrument that measures a Brillouin frequency shift ($\Delta\upsilon_B$), and the opto-electrical interface 115 may include an Optical Frequency-Domain Rayleigh-backscatter reflectometer (frequency-swept DAS) instrument that measures a relative wavelength shift ($\Delta\lambda/\lambda$) or, equivalently, a relative optical frequency shift ($\Delta\upsilon/\upsilon$). The Rayleigh backscatter instrument may also be a standard, pulse-based DAS system configured to measure slowly varying phase changes caused by temperature changes, strain changes, or both. Regarding Rayleigh measurements, whether the instrument measures phase shift (e.g., a pulse-based DAS) or a relative frequency shift (OFDR DAS), the measurement will be directly related to local changes in optical path length (n(z)L(z), the product of the effective index of refraction of the optical fiber and the fiber length, with z being the position along the optical fiber). Consequently, the outputs of a pulse-based DAS and an OFDR DAS are linearly related (the opposite of linearly independent) measurements. For this reason, phase shifts from a pulsed-base DAS and frequency (or wavelength) shifts in OFDR-based DAS produce equivalent outputs for the purpose of this invention. Furthermore, for an OFDR-based DAS instrument, a wavelength shift is equivalent to a frequency shift because there is a one-to-one correspondence between the wavelength and frequency of a light signal. Heretofore herein, the OFDR output is described as a frequency shift ($\Delta\upsilon$).

A temperature sensitivity slope and a strain sensitivity slope can be obtained for each of a first measurement by the opto-electrical interface 114 (e.g., a Brillouin frequency shift) and a second measurement by the opto-electrical interface 115 (e.g., a relative optical fiber frequency shift as measured using the OFDR Rayleigh instrument, or a phase-shift measured using a standard pulse-based, OTDR DAS Rayleigh instrument). Sensitivity slopes can be used as coefficients in the equations describing each of the frequency or phase shift measurements from the different opto-electrical interfaces 114, 115. The equations can include both temperature shift coefficients and strain change coefficients, and the sensitivity slopes can represent either a strain coefficient or a temperature coefficient in the equations. Finding a temperature shift output and a strain change output from the resulting equations can include inverting the equations. For example, the frequency or phase shift can be independently proportional to strain and temperature.

At every location along the fiber-optic cable 112, the total Brillouin frequency shift, x, and the total Rayleigh frequency (or phase) shift, y, can be described using the following equations:

$$x = B_T \Delta T + B_\varepsilon \Delta \varepsilon \quad \text{(Equation 1)}$$

$$y = R_T \Delta T + R_\varepsilon \Delta \varepsilon \quad \text{(Equation 2)}$$

where $B_T$ is the temperature sensitivity slope of the Brillouin instrument, $R_T$ is the temperature sensitivity slope of the Rayleigh instrument, $\Delta T$ is the temperature change, $B_\varepsilon$ is the strain sensitivity slope of the Brillouin instrument, $R_\varepsilon$ is the strain sensitivity slope of the Rayleigh instrument, and $\Delta \varepsilon$ is the strain change.

The equations 1 and 2 can be used in an inversion when the equations 1 and 2 are linearly independent. Linear independence between the equations may be determined by a determinant D of a sensitivity matrix of equations 1 and 2 being non-zero. The determinant D may be defined by the following equation:

$$D = B_T R_\varepsilon - R_T B_\varepsilon \quad \text{(Equation 3)}$$

If the determinant is non-zero, then the previously unknown temperature shift and the previously unknown change in strain can be determined using the following equations:

$$\Delta T = (R_\varepsilon x \times B_\varepsilon y)/D \quad \text{(Equation 4)}$$

$$\Delta \varepsilon = (-R_T x + B_T y)/D \quad \text{(Equation 5)}$$

In some examples, estimates of measurement uncertainty can be evaluated. The estimates of measurement uncertainty may be used to ensure that the temperature shift and the strain change found in equations 4 and 5 are sufficiently accurate. The respective uncertainties on the temperature shift and strain change can be described by the following equations:

$$\delta \Delta T = (R_\varepsilon^2 \delta x^2 + B_\varepsilon^2 \delta y^2)^{0.5}/D \quad \text{(Equation 6)}$$

$$\delta \Delta \varepsilon = (R_T^2 \delta x^2 + B_T^1 \delta y^2)^{0.5}/D \quad \text{(Equation 7)}$$

As an example, the uncertainty magnitudes are calculated using typical values for the standard errors δx and δy that are characteristics of the instruments in use, and the fiber-dependent sensitivities of the measurements. The typical values used in the example include: δx=0.1 MHz, which corresponds to 0.1° C. when measuring temperature only; δy=5×10⁻⁶, which corresponds to 6.4με when measuring strain only; $B_T$=0.95 MHz/C°; $B_\varepsilon$=505.5 MHz/%; $R_T$=6.45×10−6/C°; and $R_\varepsilon$=7.80×10⁻³/%. The resulting uncertainty values, δΔT and δΔε, are: δΔT=0.64° C.; and δΔε=11.6με.

These uncertainty values indicate the example including typical values of the fiber-optic measurement system 113 may result in temperature and strain change measurements that are reasonably accurate. Examples of acceptable values are not limited to these, and improvements to instruments over time may further change these typical values.

In an example, the computing device 126 may operate as a wellbore operation controller. For example, the computing device 126 may control a pump system 122 based on the data obtained by the fiber-optic measurement system 113 from the wellbore 104. Specifically, a temperature shift output and a strain change output can be used to control a wellbore operation. For example, the wellbore operation may include a hydraulic fracturing operation involving pumping of hydraulic fracturing fluid under pressure into a section 108 of the wellbore 104. In an example, pumping hydraulic fracturing fluid can be controlled based on the temperature and strain. The pressure of the hydraulic fracturing fluid can create fractures 110 within the formation 106 near a fracturing plug 111 positioned within the wellbore 104. Through these fractures 110, hydrocarbons may be able to flow into the wellbore 104 more freely.

In additional examples, as the fiber-optic measurement system 113 obtains the frequency shift data from the wellbore 104, the computing device 126 may control the pump system 122 to adjust a proppant concentration in a fracturing fluid, a pumping rate of the fracturing fluid, a fracturing fluid pressure, or any other hydraulic fracturing parameters that are adjustable to increase the hydraulic fracturing efficiency based on the frequency shift data obtained from the wellbore 104.

While FIG. 1 is described with respect to a fracturing operation within the wellbore 104, other wellbore operations may also be controlled in a similar manner based on the frequency shift data obtained from the wellbore 104 by the fiber-optic measurement system 113. Further, while only a single fracturing stage is shown in FIG. 1, multiple fracturing stages may be monitored and controlled using the systems and techniques described herein. For example, several additional fracturing stages may be located further downhole from the fractures 110, and the fiber-optic cable 112 may extend into the wellbore 104 to provide monitoring in each of the additional stages.

Figure 2:
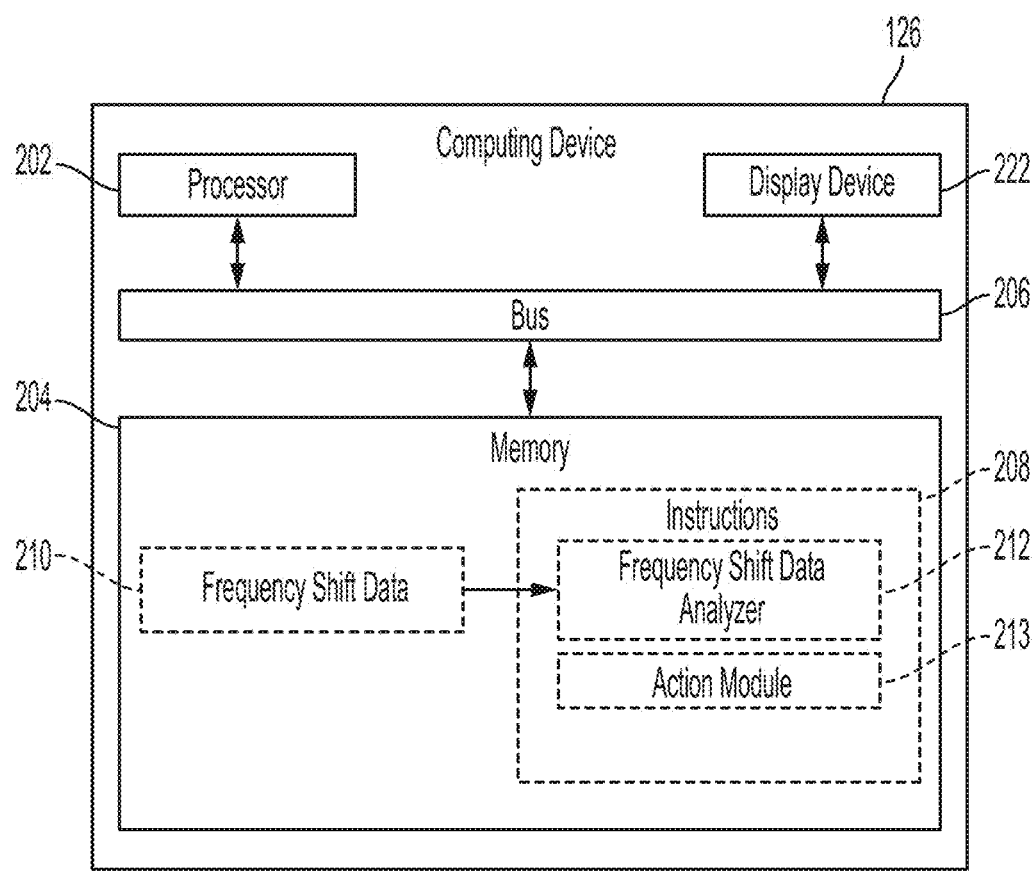
FIG. 2 is a block diagram of an example of a computing device according to one example of the present disclosure.

FIG. 2 is a block diagram of an example of a computing device 126 according to some aspects of the present disclosure. While FIG. 2 depicts the computing device 126 as including certain components, other examples may involve more, fewer, or different components than are shown in FIG. 2.

As shown, the computing device 126 includes a processor 202 communicatively coupled to a memory 204 by a bus 206. The processor 202 can include one processor or multiple processors. Non-limiting examples of the processor 202 include a Field-Programmable Gate Array (FPGA), an application-specific integrated circuit (ASIC), a microprocessor, or any combination of these. The processor 202 can execute instructions 208 stored in the memory 204 to perform operations. In some examples, the instructions 208 can include processor-specific instructions generated by a compiler or an interpreter from code written in any suitable computer-programming language, such as C, C++, C#, or Java.

The memory 204 can include one memory device or multiple memory devices. The memory 204 can be non-volatile and may include any type of memory device that retains stored information when powered off. Non-limiting examples of the memory 204 include electrically erasable and programmable read-only memory (EEPROM), flash memory, or any other type of non-volatile memory. At least some of the memory device includes a non-transitory computer-readable medium from which the processor 202 can read the instructions 208. A non-transitory computer-readable medium can include electronic, optical, magnetic, or other storage devices capable of providing the processor 202 with the instructions 208 or other program code. Non-limiting examples of a non-transitory computer-readable medium include magnetic disk(s), memory chip(s), ROM, random-access memory (RAM), an ASIC, a configured processor, optical storage, or any other medium from which a computer processor can read the instructions 208.

The memory 204 may include frequency shift data 210 that is received from the opto-electrical interfaces 114, 115. The frequency shift data 210 may be subject to respective sensitivity ratios to temperature and strain associated with the instrument that detected the measurement. The instructions 208 may include a frequency (or phase) shift data analyzer 212 that can receive the frequency shift data 210 as input, determine changes to both frequency and temperature within the wellbore 104, and, in some instances, provide an output indicating an adjustment to implement in a wellbore operation.

For example, the computing device 126 can execute an action module 213 based on the temperature and strain data of the wellbore 104 determined by the frequency shift data analyzer 212. The action module 213 can include executable program code for taking one or more actions for controlling a wellbore operation. For example, the action module 213 may generate an output indicating new parameters of a hydraulic fracturing operation, such as a fracturing fluid pumping rate, a new blend of proppant within the fracturing fluid, a new chemical additive concentration for use in the fracturing fluid, or any combination thereof for the hydraulic fracturing operation. In additional examples, the action module 213 may control other operations within the wellbore based on the temperature and strain information determined by the frequency shift data analyzer 212.

In some examples, a display device 222 of the computing device 126 may output a graphical user interface (GUI) that identifies the proposed changes to the parameters of the wellbore operation. In an example, the proposed changes to the parameters that are displayed on the display device 222 may be accepted or rejected by an operator of the wellbore operation.

Figure 3:
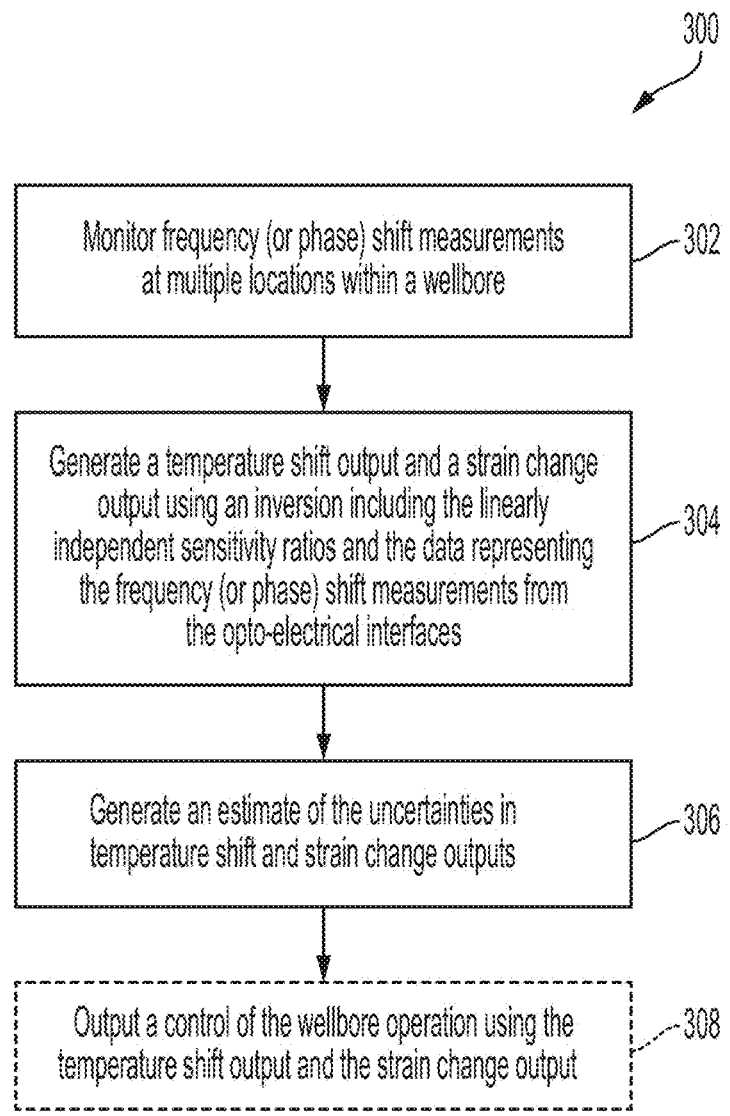
FIG. 3 is a flowchart of a process for controlling a wellbore operation using a temperature shift output and a strain change output according to one example of the present disclosure.

FIG. 3 is a flowchart of a process 300 for controlling a wellbore operation with a temperature shift output and a strain change output according to one example of the present disclosure. The computing device 126 may perform the operations described in the process 300.

At block 302, the computing device 126 monitors frequency or phase shift measurements at multiple locations within the wellbore 104. The opto-electrical interfaces 114, 115 may detect the frequency or phase shift measurements and provide indications of those measurements to the computing device 126. As discussed above, the opto-electrical interfaces 114, 115 can monitor different types of measurements, such as a Brillouin frequency shift measurement detected by a Brillouin-backscatter instrument and a relative optical frequency shift detected by a Rayleigh Optical Frequency Domain instrument.

In an example, the opto-electrical interfaces 114, 115 may monitor frequency shifts or phase shifts using two instruments connected to one optical fiber in the fiber-optic cable 112. The instruments may monitor frequency shifts or phase shifts with their interrogators 102a and 102b multiplexed into the optical fiber at the surface using a wavelength-division multiplexer (also known as optical add/drop multiplexers, OADM). In an additional example, the opto-electrical interfaces 114, 115 may monitor frequency shifts using a serial transmission (e.g., a timed optical switch) for the optical signals transmitted into the fiber-optic cable 112. Further, the opto-electrical interfaces 114, 115 may be connected to two distinct optical fibers that are part of fiber-optic cable 112.

At block 304, the computing device 126 obtains values for the temperature and strain changes using linearly independent sensitivity equations associated with the interrogators 102a, 102b of the opto-electrical interfaces 114, 115. In an example, a non-zero value of the determinant of equation 3 indicates that the sensitivity ratios of the interrogators 102a, 102b are linearly independent. In particular, the frequency (or phase) shift data analyzer 212 may use the equations 4 and 5, as provided above, to solve for the variables of $\Delta T$ and $\Delta \varepsilon$.

In some examples, at block 306, the computing device 126 may generate an estimate of the measurement uncertainties based on the measured frequency or phase shifts, the fiber sensitivity coefficients, and the instrument measurement standard errors (or resolution) values. In particular, the frequency shift data analyzer 212 may use the equations 6 and 7, as provided above, to solve for the uncertainties $\delta \Delta T$ and $\delta \Delta \varepsilon$.

In some examples, at block 308, the computing device 126 may control a wellbore operation based on the temperature shift output and the strain change output. For example, the computing device 126 may adjust parameters of a hydraulic fracturing operation to improve results of the hydraulic fracturing operation. The adjustable parameters may include changing the RPM, gears, and number of pumps to adjust surface pressure provided by the pump system 122 to pump the hydraulic fracturing fluid into the wellbore 104. The adjustable parameters may also include changing a proppant concentration that is blended into the hydraulic fracturing fluid by a blender. Additionally, the adjustable parameters can include the chemical additives provided by a chemical additive controller, such as viscosifiers, friction reducers, acid breakers, particulate diverters, gel, or crosslinkers that are added to the hydraulic fracturing fluid. During production (or injection), the adjustable wellbore operation may be closing or opening a downhole valve to change the flow rate from (or into) a downhole formation zone. Any other adjustable wellbore operations may be also be controlled by the computing device 126 using the temperature shift output and the strain change output.

Figure 4:
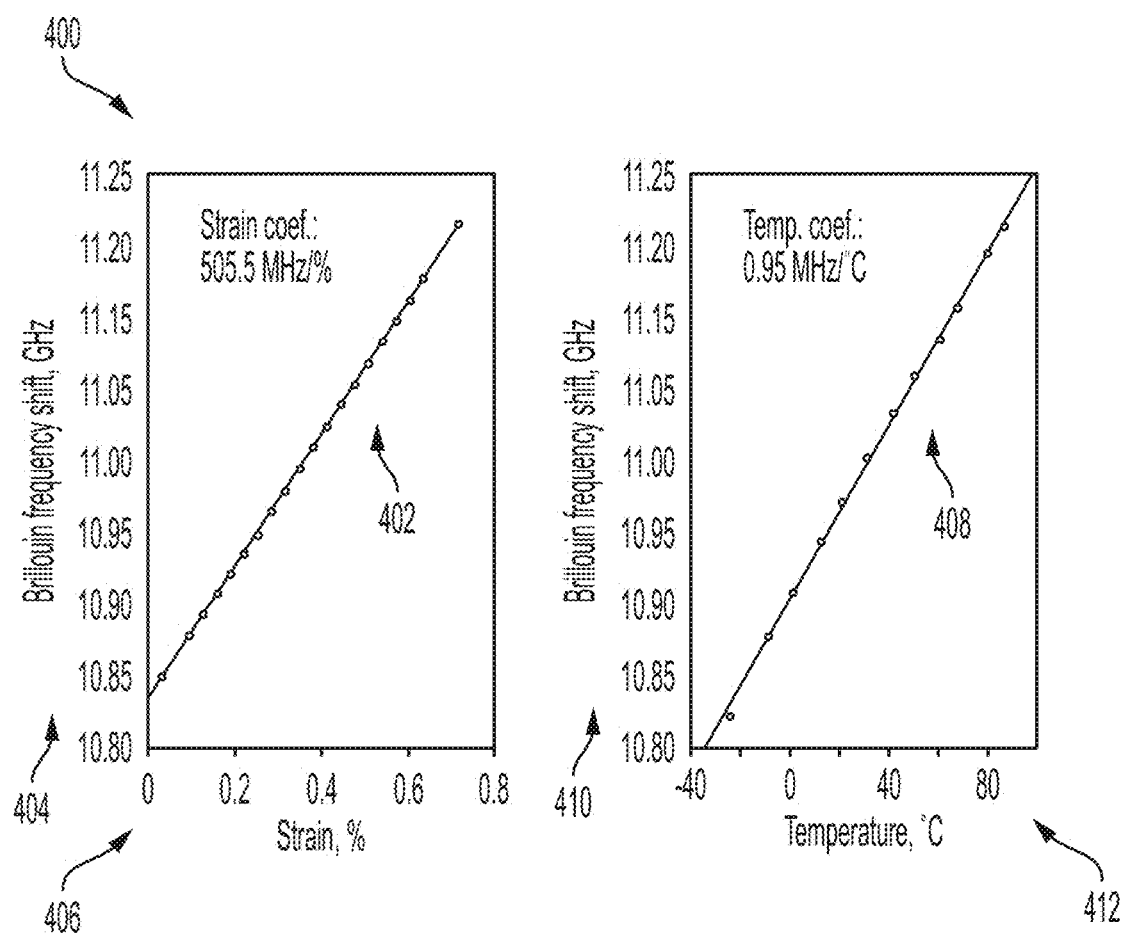
FIG. 4 is a graph of an example of sensitivity slopes for temperature and strain using a fiber-optic sensing technique according to one example of the present disclosure.

FIG. 4 is a graph of an example of sensitivity coefficients for temperature and strain using a Brillouin-based fiber-optic sensing technique according to one example of the present disclosure. The graph shows a sensitivity slope 402 for a strain change along a fiber-optic cable and a sensitivity slope 408 for a temperature shift along the fiber-optic cable coupled to a Brillouin instrument. The sensitivity slopes 402 and 408 can indicate the relationship between Brillouin shift measurements 404, 410 and either the strain change output 406 or the temperature shift output 412. In an example, using this particular Brillouin instrument, the sensitivity slopes 402 and 408 can be used as the Brillouin temperature coefficient and the Brillouin strain coefficient in the equations 1-7.

The values relating the Brillouin frequency shift 404 to the strain change output 406 can be correlated and fitted to a curve. Similarly, the values relating the measured Brillouin frequency shift 410 to the temperature shift output 412 can be correlated and fitted to a curve. The curves can each have a local sensitivity slope 402 or 408 determined from the partial derivative of the Brillouin frequency shift output to either the strain or temperature variable. These slopes can summarize the best-fit correlation for either the strain change output 406 or temperature shift output 412 to the Brillouin frequency shift measurement 404. The slopes can be either the temperature coefficient or the strain coefficient in the equation describing the Brillouin shift measurement.

A Rayleigh instrument can have similar sensitivity slopes indicating a temperature shift sensitivity and a strain change sensitivity of the Rayleigh measurement. The sensitivity slopes can similarly be determined from the sensitivity ratio of the Rayleigh measurements and best-fit curves. Additionally, the sensitivity slopes indicated for the Rayleigh measurements can be used as the Rayleigh temperature coefficient and the Rayleigh strain coefficient in the equations 1-7.

In some aspects, a system and a method for measuring temperature and strain in a wellbore using two frequency shift measurement techniques over the same fiber-optic cable are provided according to one or more of the following examples:

Example 1 is a well system comprising: a fiber-optic cable positionable downhole along a wellbore; a plurality of opto-electrical interfaces to communicatively couple to the fiber-optic cable to monitor temperature and strain along the fiber-optic cable within the wellbore; a processing device; and a memory device that includes instructions executable by the processing device to cause the processing device to: receive data representing frequency or phase shift measurements from the plurality of opto-electrical interfaces using at least two frequency or phase shift measurement techniques; and generate a temperature shift output and a strain change output using an inversion comprising a plurality of sensitivity ratios and the data representing the frequency or phase shift measurements from the plurality of opto-electrical interfaces.

Example 2 is the well system of example 1, wherein the plurality of opto-electrical interfaces includes a Brillouin-backscatter instrument and a Rayleigh-backscatter instrument, and wherein the plurality of sensitivity ratios of the Brillouin-backscatter instrument and the Rayleigh-backscatter instrument produce sensitivity equations that are linearly independent.

Example 3 is the well system of examples 1-2, wherein the frequency or phase shift measurements comprise a Brillouin frequency shift detectable by the Brillouin-backscatter instrument and a relative optical frequency shift, or phase shift, detectable by the Rayleigh-backscatter instrument.

Example 4 is the well system of examples 1-3, wherein the frequency or phase shift measurements represent a combined temperature shift and strain change relative to a reference fiber configuration of the fiber-optic cable.

Example 5 is the well system of examples 1-4, wherein the plurality of opto-electrical interfaces comprises two interrogators positionable to multiplex optical signals into the same optical fiber in the fiber-optic cable and to detect the frequency or phase shift measurements from the fiber-optic cable.

Example 6 is the well system of examples 1-5, wherein the memory device includes instructions executable by the processing device to further cause the processing device to: output a control operation for a pump system or downhole valve based on the temperature shift output or the strain change output.

Example 7 is the well system of examples 1-6, wherein the plurality of opto-electrical interfaces comprises a frequency-swept distributed acoustic sensing instrument or a standard, pulse-based distributed acoustic sensing instrument.

Example 8 is a method comprising: receiving data representing frequency or phase shift measurements from a plurality of opto-electrical interfaces using at least two frequency or phase shift measurement techniques, the plurality of opto-electrical interfaces communicatively coupled to a fiber-optic cable positioned downhole along a wellbore to monitor temperature and strain at a plurality of locations within the wellbore; and generating a temperature shift output and a strain change output using an inversion comprising a plurality of sensitivity ratios and the data representing the frequency or phase shift measurements from the plurality of opto-electrical interfaces.

Example 9 is the method of example 8, wherein the plurality of opto-electrical interfaces includes a Brillouin-backscatter instrument and a Rayleigh-backscatter instrument, and wherein the plurality of sensitivity ratios of the Brillouin-backscatter instrument and the Rayleigh-backscatter instrument produce sensitivity equations that are linearly independent.

Example 10 is the method of examples 8-9, wherein the frequency or phase shift measurements comprise a Brillouin frequency shift detected by the Brillouin-backscatter instrument and a relative optical frequency shift, or phase shift, detected by the Rayleigh-backscatter instrument.

Example 11 is the method of examples 8-10, wherein the frequency or phase shift measurements represent a combined temperature shift and strain change relative to a reference fiber configuration of the fiber-optic cable.

Example 12 is the method of examples 8-11, wherein the plurality of opto-electrical interfaces comprises two interrogators to multiplex optical signals into the same fiber in the fiber-optic cable and to detect the frequency shift or phase shifts measurements from the same fiber in the fiber-optic cable.

Example 13 is the method of examples 8-12, further comprising: outputting a control operation for a pump system based on the temperature shift output or the strain change output.

Example 14 is the method of examples 8-13, wherein the plurality of opto-electrical interfaces comprises a frequency-swept distributed acoustic sensing instrument or a standard, pulse-based distributed acoustic sensing instrument.

Example 15 is a non-transitory computer-readable medium comprising instructions that are executable by a processing device for causing the processing device to perform operations comprising: receiving data representing frequency or phase shift measurements from a plurality of opto-electrical interfaces using at least two frequency or phase shift measurement techniques, the plurality of opto-electrical interfaces communicatively coupled to a fiber-optic cable positioned downhole along a wellbore to monitor temperature and strain at a plurality of locations within the wellbore; and generating a temperature shift output and a strain change output using an inversion comprising a plurality of sensitivity ratios and the data representing the frequency or phase shift measurements from the plurality of opto-electrical interfaces.

Example 16 is the non-transitory computer-readable medium of example 15, wherein the plurality of opto-electrical interfaces includes a Brillouin-backscatter instrument and a Rayleigh-backscatter instrument, and wherein the plurality of sensitivity ratios of the Brillouin-backscatter instrument and the Rayleigh-backscatter instrument produce sensitivity equations that are linearly independent.

Example 17 is the non-transitory computer-readable medium of examples 15-16, wherein the frequency or phase shift measurements comprise a Brillouin frequency shift detected by the Brillouin-backscatter instrument and a relative optical frequency shift, or phase shift, detected by the Rayleigh-backscatter instrument.

Example 18 is the non-transitory computer-readable medium of examples 15-17, wherein the plurality of opto-electrical interfaces comprises two interrogators to multiplex optical signals into the fiber-optic cable and to detect the frequency or phase shift measurements from the fiber-optic cable.

Example 19 is the non-transitory computer-readable medium of examples 15-18, wherein the instructions are executable by the processing device to further cause the processing device to: output a control operation for a pump system or downhole valve based on the temperature shift output or the strain change output.

Example 20 is the non-transitory computer-readable medium of examples 15-19, wherein the plurality of opto-electrical interfaces comprises a distributed acoustic sensing instrument or a standard, pulse-based distributed acoustic sensing instrument.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A well system comprising:
   a fiber-optic cable positionable downhole along a wellbore;
   a plurality of opto-electrical interfaces to communicatively couple to the fiber-optic cable to monitor temperature and strain along the fiber-optic cable within the wellbore;
   a processing device; and
   a memory device that includes instructions executable by the processing device to cause the processing device to:
      receive data representing frequency or phase shift measurements from the plurality of opto-electrical interfaces using at least two frequency or phase shift measurement techniques; and
      generate a temperature shift output and a strain change output using an inversion comprising a plurality of sensitivity ratios and the data representing the frequency or phase shift measurements from the plurality of opto-electrical interfaces.

2. The well system of claim 1, wherein the plurality of opto-electrical interfaces includes a Brillouin-backscatter instrument and a Rayleigh-backscatter instrument, and wherein the plurality of sensitivity ratios of the Brillouin-backscatter instrument and the Rayleigh-backscatter instrument produce sensitivity equations that are linearly independent.

3. The well system of claim 2, wherein the frequency or phase shift measurements comprise a Brillouin frequency shift detectable by the Brillouin-backscatter instrument and a relative optical frequency shift, or phase shift, detectable by the Rayleigh-backscatter instrument.

4. The well system of claim 1, wherein the frequency or phase shift measurements represent a combined temperature shift and strain change relative to a reference fiber configuration of the fiber-optic cable.

5. The well system of claim 1, wherein the plurality of opto-electrical interfaces comprises two interrogators positionable to multiplex optical signals into the same optical fiber in the fiber-optic cable and to detect the frequency or phase shift measurements from the fiber-optic cable.

6. The well system of claim 1, wherein the memory device includes instructions executable by the processing device to further cause the processing device to:
   output a control operation for a pump system or downhole valve based on the temperature shift output or the strain change output.

7. The well system of claim 1, wherein the plurality of opto-electrical interfaces comprises a frequency-swept distributed acoustic sensing instrument or a standard, pulse-based distributed acoustic sensing instrument.

8. A method comprising:
   receiving data representing frequency or phase shift measurements from a plurality of opto-electrical interfaces using at least two frequency or phase shift measurement techniques, the plurality of opto-electrical interfaces communicatively coupled to a fiber-optic cable positioned downhole along a wellbore to monitor temperature and strain at a plurality of locations within the wellbore; and
   generating a temperature shift output and a strain change output using an inversion comprising a plurality of sensitivity ratios and the data representing the frequency or phase shift measurements from the plurality of opto-electrical interfaces.

9. The method of claim 8, wherein the plurality of opto-electrical interfaces includes a Brillouin-backscatter instrument and a Rayleigh-backscatter instrument, and wherein the plurality of sensitivity ratios of the Brillouin-backscatter instrument and the Rayleigh-backscatter instrument produce sensitivity equations that are linearly independent.

10. The method of claim 9, wherein the frequency or phase shift measurements comprise a Brillouin frequency shift detected by the Brillouin-backscatter instrument and a relative optical frequency shift, or phase shift, detected by the Rayleigh-backscatter instrument.

11. The method of claim 8, wherein the frequency or phase shift measurements represent a combined temperature shift and strain change relative to a reference fiber configuration of the fiber-optic cable.

12. The method of claim 8, wherein the plurality of opto-electrical interfaces comprises two interrogators to multiplex optical signals into the same fiber in the fiber-optic cable and to detect the frequency shift or phase shifts measurements from the same fiber in the fiber-optic cable.

13. The method of claim 8, further comprising:
   outputting a control operation for a pump system based on the temperature shift output or the strain change output.

14. The method of claim 8, wherein the plurality of opto-electrical interfaces comprises a frequency-swept distributed acoustic sensing instrument or a standard, pulse-based distributed acoustic sensing instrument.

15. A non-transitory computer-readable medium comprising instructions that are executable by a processing device for causing the processing device to perform operations comprising:
   receiving data representing frequency or phase shift measurements from a plurality of opto-electrical interfaces using at least two frequency or phase shift measurement techniques, the plurality of opto-electrical interfaces communicatively coupled to a fiber-optic cable positioned downhole along a wellbore to monitor temperature and strain at a plurality of locations within the wellbore; and generating a temperature shift output and a strain change output using an inversion comprising a plurality of sensitivity ratios and the data representing the frequency or phase shift measurements from the plurality of opto-electrical interfaces.

16. The non-transitory computer-readable medium of claim 15, wherein the plurality of opto-electrical interfaces includes a Brillouin-backscatter instrument and a Rayleigh-backscatter instrument, and wherein the plurality of sensitivity ratios of the Brillouin-backscatter instrument and the Rayleigh-backscatter instrument produce sensitivity equations that are linearly independent.

17. The non-transitory computer-readable medium of claim 16, wherein the frequency or phase shift measurements comprise a Brillouin frequency shift detected by the Brillouin-backscatter instrument and a relative optical frequency shift, or phase shift, detected by the Rayleigh-backscatter instrument.

18. The non-transitory computer-readable medium of claim 15, wherein the plurality of opto-electrical interfaces comprises two interrogators to multiplex optical signals into the fiber-optic cable and to detect the frequency or phase shift measurements from the fiber-optic cable.

19. The non-transitory computer-readable medium of claim 15, wherein the instructions are executable by the processing device to further cause the processing device to:

output a control operation for a pump system or downhole valve based on the temperature shift output or the strain change output.

20. The non-transitory computer-readable medium of claim 15, wherein the plurality of opto-electrical interfaces comprises a distributed acoustic sensing instrument or a standard, pulse-based distributed acoustic sensing instrument.

* * * * *